United States Patent [19]

Paul et al.

[11] 3,736,971

[45] June 5, 1973

[54] AMPHIBIOUS TIRES WITH IMPROVED TORQUE RESISTANCE PROPERTIES

[75] Inventors: Richard Henry Paul; James Perry Wilson, Indianapolis, both of Ind.

[73] Assignee: Uniroyal, Inc., New York, N.Y.

[22] Filed: Apr. 14, 1971

[21] Appl. No.: 133,861

[52] U.S. Cl..................................152/353, 152/367
[51] Int. Cl.................................................B60c 9/00
[58] Field of Search......................152/393, 353, 343, 152/362, 367

[56] References Cited

UNITED STATES PATENTS

| | | | |
|---|---|---|---|
| 3,638,705 | 2/1972 | Devienne | 152/362 R X |
| 1,966,397 | 7/1934 | Sohl | 152/362 R X |
| 3,557,860 | 1/1971 | Maiocchi | 152/362 R |

*Primary Examiner*—James B. Marbert
*Assistant Examiner*—Jerold M. Forsberg
*Attorney*—Norbert P. Holler

[57] ABSTRACT

An amphibious tire construction for use with "all-terrain" vehicles and having improved resistance to failure, particularly in the hub area under severe acceleration and braking stresses are disclosed. In such a tire, the axial openings in the sidewalls are disposed concentrically with a rigid, tubular hub, and the sidewalls are vulcanized or bonded at their radially inwardmost edge regions bounding said openings, directly to the respective opposite ends of the hub. The sidewalls are reinforced by respective centrally apertured disc-shaped patches incorporated in the sidewalls concentrically with the hub. Each such patch consists of a laminate of a plurality of strips of calender coated fabric stock superimposed on each other in a crossing, asterisk-like fashion so that the patch is thickest in the region thereof which is immediately adjacent its central opening and decreases in thickness gradually through the surrounding regions located radially outwardly of the central region. A tire so reinforced has a greater rigidity at the critical area thereof, which is in the vicinity of the hub, than at other sidewall areas, with this rigidity decreasing in the direction radially outwardly from the hub so that overall sidewall flexibility is effectively not impaired.

15 Claims, 23 Drawing Figures

Patented June 5, 1973

INVENTORS
RICHARD H. PAUL
JAMES P. WILSON

Patented June 5, 1973 3,736,971

INVENTORS
RICHARD H. PAUL
JAMES P. WILSON

Patented June 5, 1973 3,736,971

INVENTORS
RICHARD H. PAUL
JAMES P. WILSON

Patented June 5, 1973

INVENTORS
RICHARD H. PAUL
JAMES P. WILSON

AMPHIBIOUS TIRES WITH IMPROVED TORQUE RESISTANCE PROPERTIES

BACKGROUND OF THE INVENTION

This invention relates, in general, to amphibious tires which are utilized on what are commonly called "all-terrain" vehicles and in particular to tires of this nature having improved torque resistance properties so as to resist and prevent tire failure under severe acceleration and deceleration or braking situations.

DESCRIPTION OF THE PRIOR ART

All-terrain vehicles are relatively new on the market and the production of tires for these vehicles has presented certain problems.

These tires, which are permanently mounted on rigid metal hubs, of course, must have a certain degree of resiliency as well as buoyancy at low inflation pressures. The difficulty that has arisen in the past with most of the original or first generation of tires of this nature was that they had a basic weakness, namely, susceptibility to hub and failure during acceleration and deceleration or braking and particularly during braking.

Specifically, what has occurred in many of these tires is that the tire simply tore apart at the juncture between the rubber and the metal hub. This was caused because in the original or first generation tires of this type all of the disruptive force encountered due to the torque generated by sudden braking, for example, tended to end up concentrated at one localized point, and at this point the rubber would tear loose from the hub thereby rendering the tire unusable. As the operating speed of these vehicles increases, this problem will undoubtedly be magnified.

The primary solutions in the prior art to this problem have been to provide radial ribs or flutes in the sidewalls of the tires adjacent the hub area or alternatively to use a high modulus stock in this area.

Both of these solutions to the problem have proven unsatisfactory in that they are relatively expensive and even with the added expense, do not satisfactorily solve the problem.

Applicants are unaware of any pertinent patent prior art directed to solving these problems.

SUMMARY OF THE INVENTION

It has been discovered that the above-mentioned problems can be overcome and improved torque resistance properties can be obtained by incorporating a disc-like patch of calender coated fabric stock in each of the sidewalls of such a tire adjacent the hub area of the same. In general, a patch of this nature is made up of a centrally apertured laminate of a plurality of strips of such stock angularly disposed in such a manner, i.e., in an asterisk-like fashion, as to provide the thickest concentration of reinforcing material adjacent the center of the tire sidewall around the hub and diminishing concentrations of reinforcing material radially outwardly thereof, which permits an improved and strengthened tire to be produced without sacrificing the resiliency necessary for good ride characteristics.

Specifically, it has been found that this structure ties the sidewalls together and prevents a localized concentration of forces. Stated otherwise, the disruptive forces caused by the torque of acceleration or braking are distributed over a much greater area than would otherwise be the case, thereby preventing the tire from tearing loose from the hub.

It has also been found that in the manufacture of such tires, a high molding pressure can be used without any risk of buckling of the rubber of the sidewalls adjacent the hub. This is important because one difficulty which has been encountered in the production of these tires has been obtaining a secure bond between the tire. Thus, prior to our invention the presence of too much rubber in the hub regions of the sidewalls, placed there for strength purposes, has led to buckling of the sidewalls during molding and to a consequent high incidence of scrap tires. On the other hand, with less rubber there, less molding pressure had to be used, which resulted in insufficient rubber to metal bond strength. The presence of the reinforcing patch provided by the present invention now makes it possible to employ extremely high pressure during the initial stages of molding. Any excess rubber is displaced about the hub, and the fabric patch prevents buckling. The patch not only beefs up the hub and the sidewall at the critical area adjacent the flange of the hub but permits this area to be beefed up while enabling the circumferential flex groove which is common to tires of this nature to be retained.

Accordingly, production of an improved tire having the above-noted characteristics becomes the principal object of this invention, with other objects thereof becoming more apparent upon a reading of the following brief specification, considered and interpreted in view of the accompanying drawings.

Figure 3:
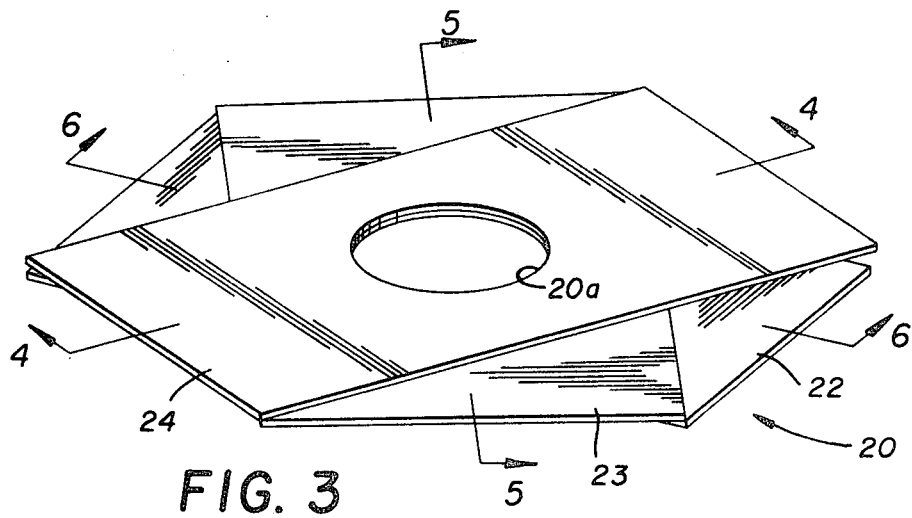
FIG. 3 is a perspective view showing a laminated patch of the type discussed herein employing three strips of stock.
Figure 4:
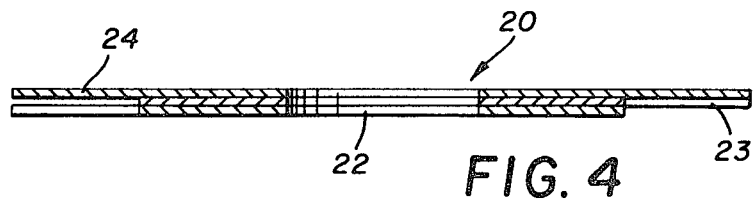
Figure 5:
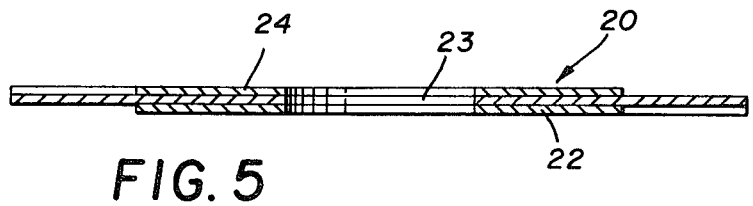
Figure 6:
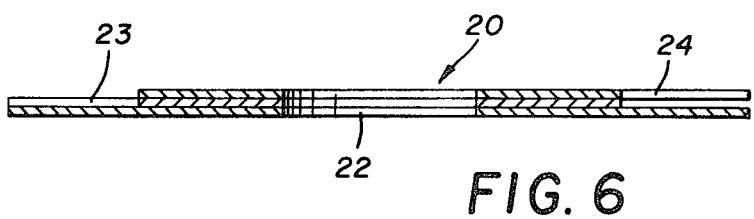

FIGS. 4, 5 and 6 are sectional views taken on the lines 4—4, 5—5 and 6—6 of FIG. 3.

Figure 7:
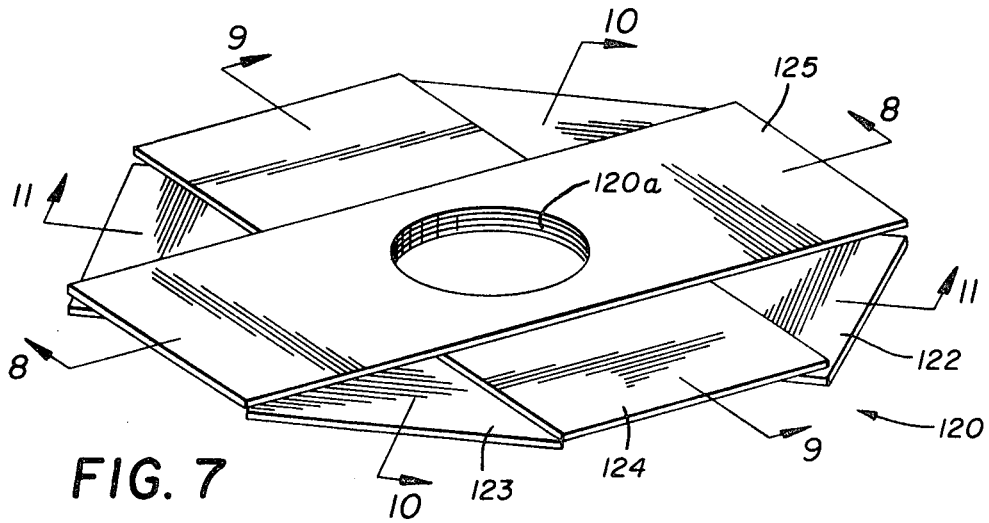
Figure 8:
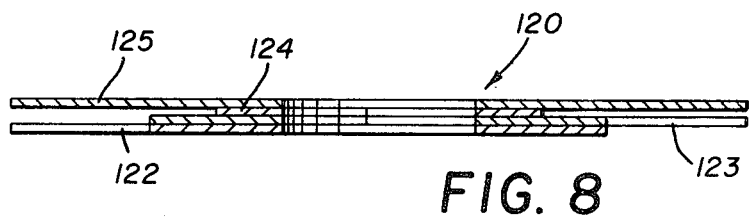
Figure 9:
Figure 10:
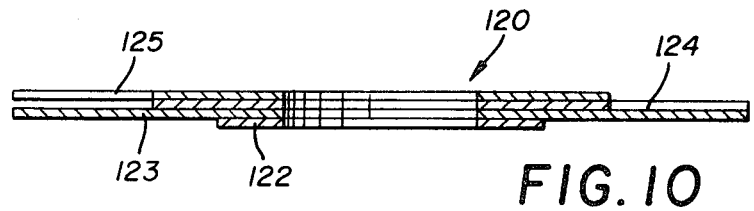
Figure 11:

FIG. 7 is another perspective view showing an additional patch including four strips of stock.

FIGS. 8, 9, 10 and 11 are sectional views taken along the lines 8—8, 9—9, 10—10 and 11—11 of FIG. 7.

Figure 12:
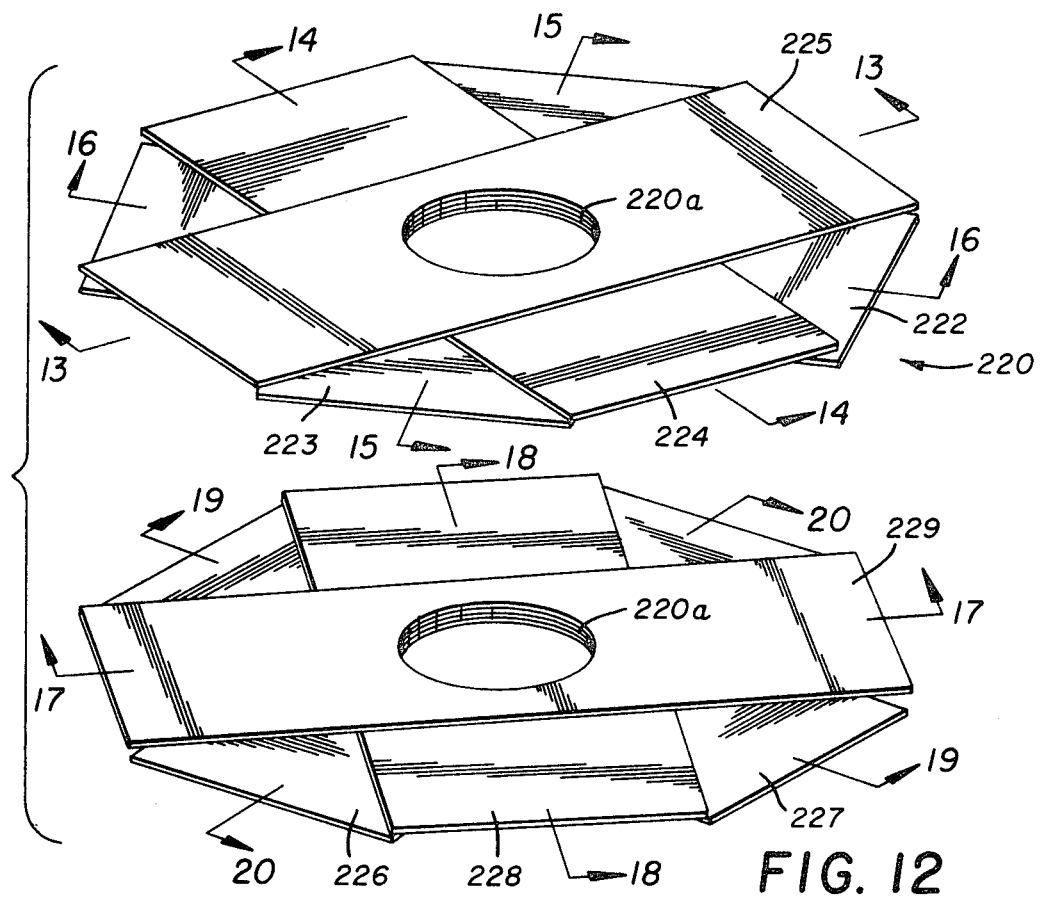
Figure 13:
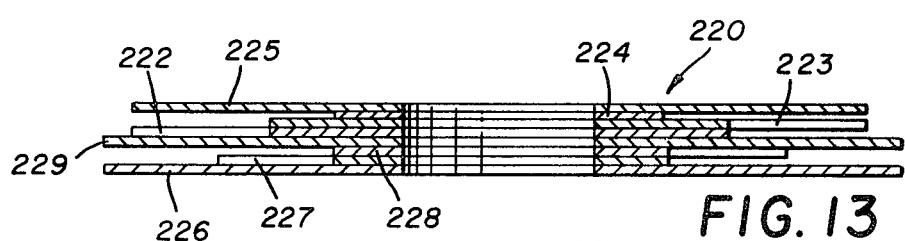
Figure 14:
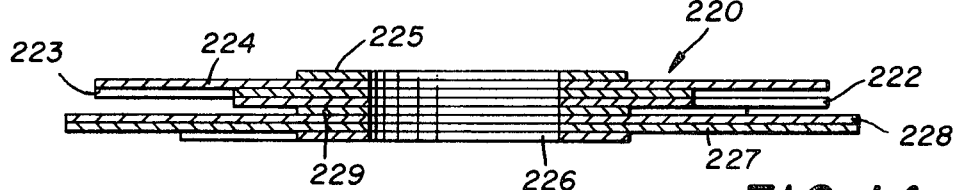
Figure 15:
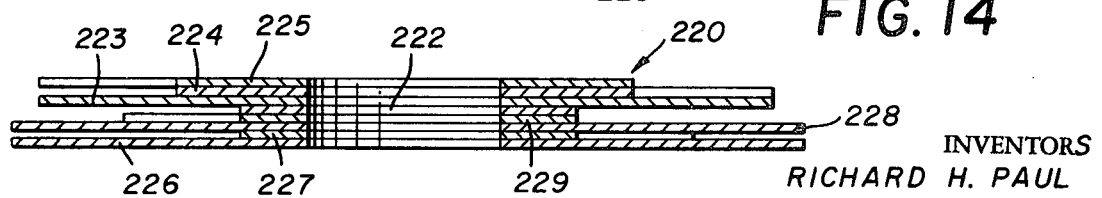
Figure 16:
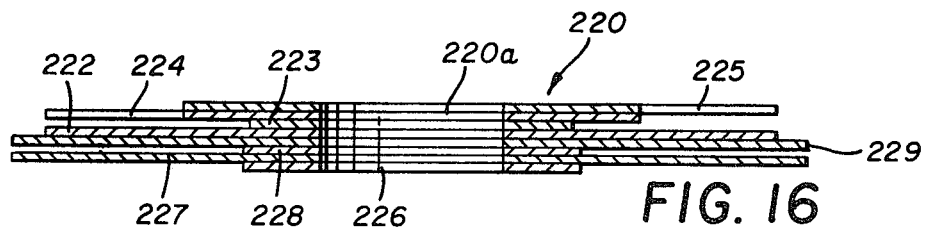
Figure 17:
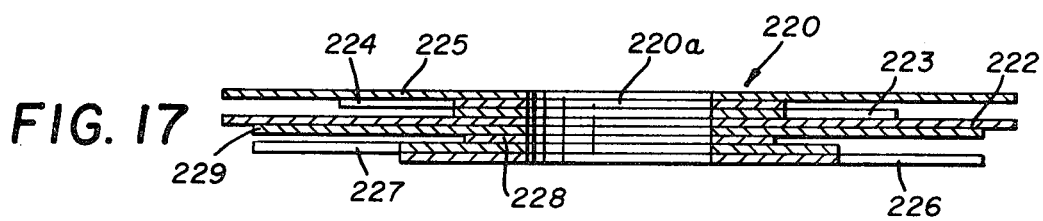
Figure 18:
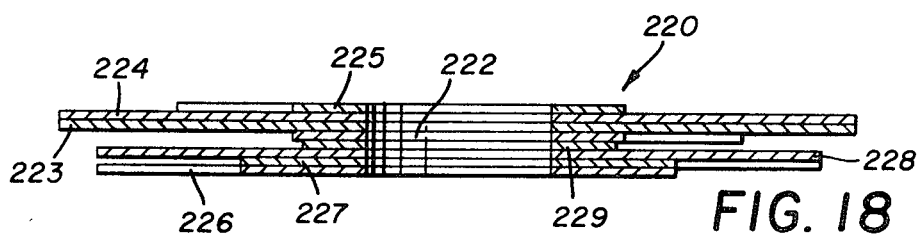
Figure 19:
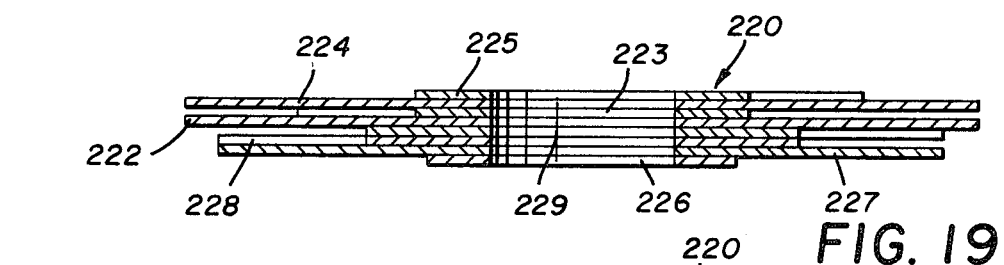
Figure 20:
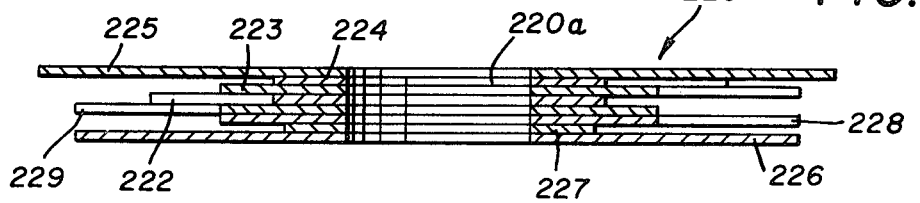

FIG. 12 is a perspective exploded view showing a still further patch made up of two four-ply laminates of the type shown in FIG. 7.

FIGS. 13, 14, 15, 16, 17, 18, 19 and 20 are sectional views taken along the lines 13—13, 14—14, 15—15, 16—16, 17—17, 18—18, 19—19 and 20—20 of FIG. 12.

Figure 21:
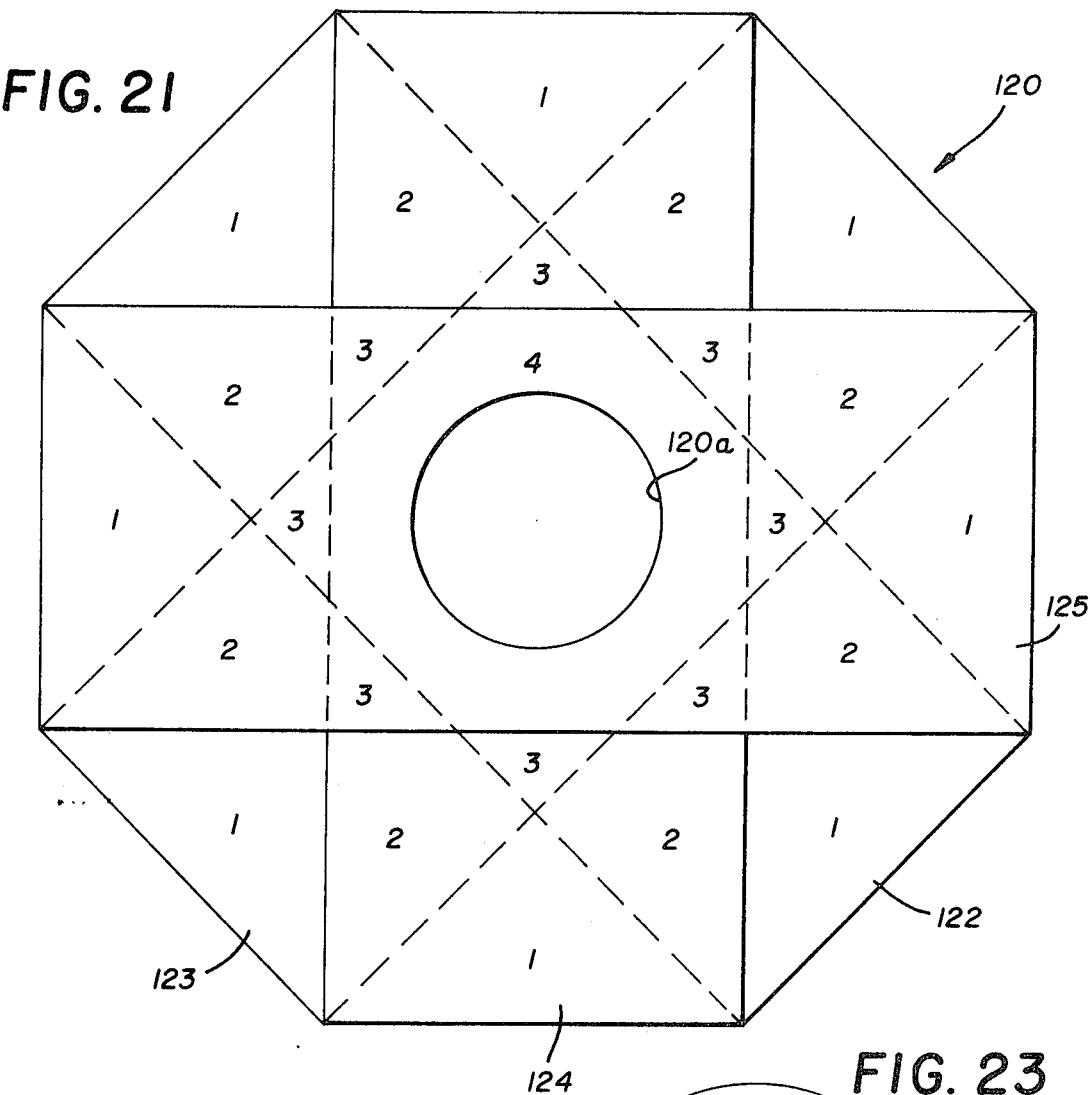

FIG. 21 is a plan view of a four-ply patch with certain indicia placed thereon to illustrate the relative strengths of various areas of the finished laminate.

Figure 22:
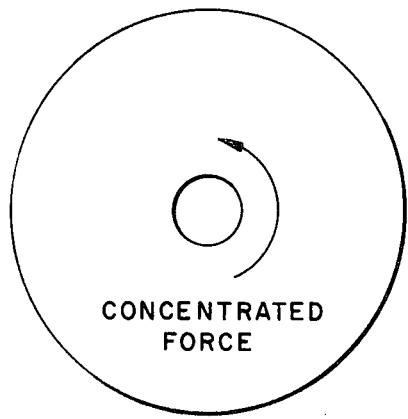
Figure 23:
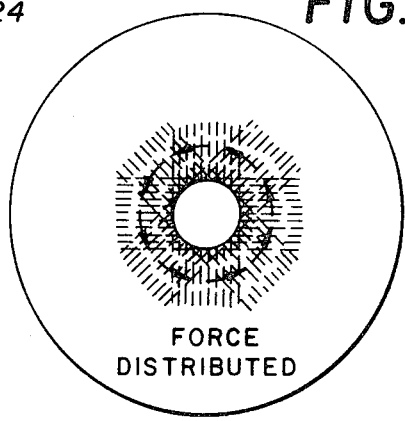

FIGS. 22 and 23 are schematic view illustrating the improved torque resistant properties of the tire.

DESCRIPTION OF THE PREFERRED EMBODIMENTS

Figure 1:
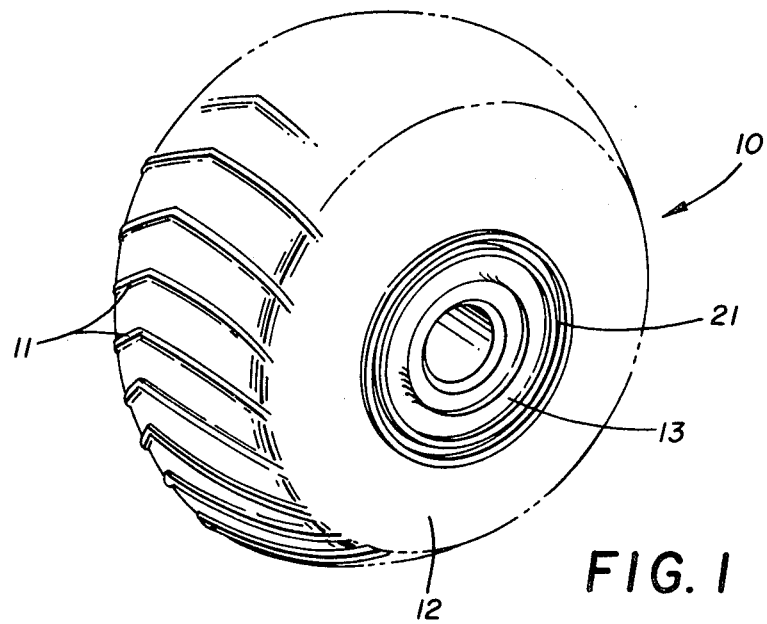
FIG. 1 is a perspective view of the improved tire.
Figure 2:
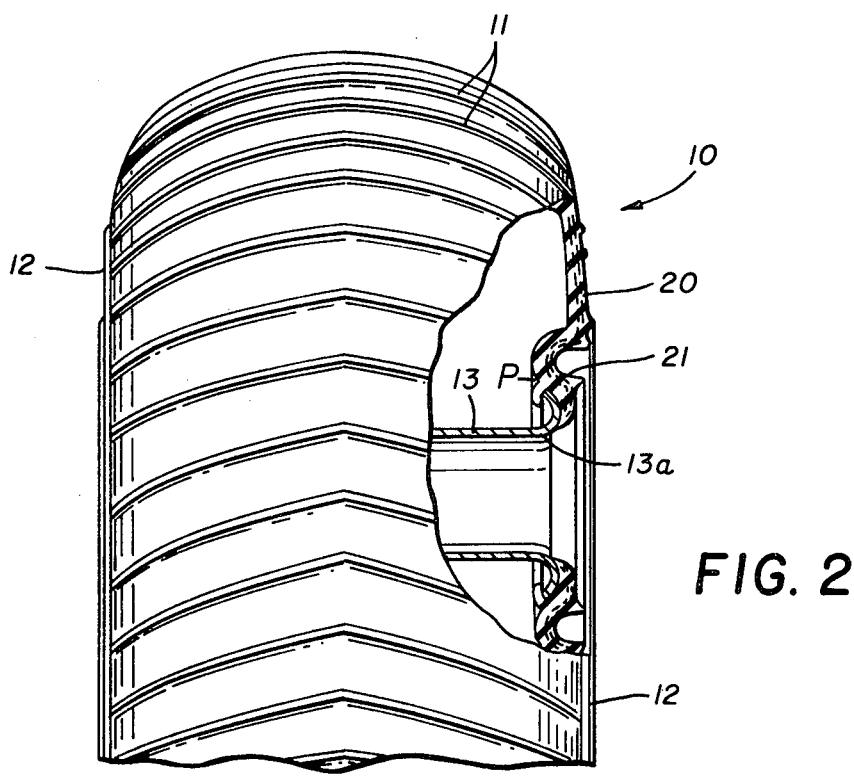
FIG. 2 is an elevational view partially broken away and in section showing the reinforcement patch in position in a completed tire.

Considering first FIGS. 1 and 2, it will be noted that the tire, generally indicated by the numeral 10, includes sidewalls 12,12 with annular flex grooves 21 therein, and a tread 11. Incorporated in each sidewall 12 is a disc-like reinforcing patch 20 to be more fully described presently. This tire is mounted on a rigid metal hub 13, being vulcanized at the radially inwardmost edges of the sidewalls directly to the flanges 13a of the hub, so that the latter and the tire become an integral structure. In this regard, the tire consists, in the hub area, of a tie gum circle on each flange 13a followed by the sidewall rubber and the patch 20.

Turning next then to FIGS. 3 and 6, it will be seen that the reinforcement patch 20 is a three-ply laminate of rectangular strips of calender coated fabric stock 22, 23 and 24 disposed angularly, i.e., in an asterisk-like fashion, relative to each other. The disc is provided with a central opening or hole 20a die cut through the laminate and of sufficient diameter to accommodate flange 13a of hub 13.

Examination of FIG. 3, which illustrates one form of laminate, will show that the patch 20 has the shape of a hexagonal planar disc-like configuration when completed. Other planar configurations are achieved, of course, by the utilization of different numbers of plies, but the essential point is that the strips are angularly disposed and overlapped in the manner shown, i.e., in an asterisk-like fashion, to obtain a maximum thickness in the center region of the patch.

At this point, it should be noted that the sectional views of FIGS. 4, 5 and 6 are somewhat exaggerated and schematic in nature and intended to illustrate the relative thicknesses of the patch at different regions thereof. It should be remembered, however, that while the radially outboard ends of the plies 22, 23 and 24 in FIGS. 4, 5 and 6 are shown as lying in different planes, they would, in practice, all lie in substantially the same plane.

In hub surface is a tire of this nature, the building first prepared by blasting or some other suitable method following which a suitable cement is applied to the flange of the hub. Following this, two tie gum circles are applied directly to each flange.

Next the sidewall and tread are applied in conventional fashion. Following this, the patches 20,20 are gassed on one side each and applied directly to the sidewalls with the openings 20a, of course, encircling the hub.

Following this, the tire is placed into the mold and cured.

It will be readily apparent that a tire having patches of this nature cured into the sidewalls will have the maximum amount of reinforcement provided in the region immediately adjacent the flanges 13a, 13a of the hub 13 because, due to the overlapping and angular disposition of the plies, the greatest thickness of material will be present in this area.

Progressing radially outwardly from the hub, the thickness of patches 20,20 will diminish and the rigidity of the sidewalls will, of course, diminish along with it. In this fashion, improved strength to resist torque forces is obtained immediately adjacent the hub where these forces are highest, with this rigidity and strength decreasing radially outwardly so that the resiliency and flexibility of the overall tire is not seriously impaired.

FIGS. 22 and 23 illustrate schematically the advantages obtained. Thus, FIG. 22 shows represents a tire without the extra reinforcing means of the present invention and shows how the torque forces are concentrated in a localized area around the hub which would cause tearing at point P (See FIG. 2). FIG. 23 shows how the reinforcing patches permit these forces to be distributed over a greater area thus obviating tearing.

Actual tests have shown that tires having the reinforcing patches generally wear out at the tread lugs rather than encounter "torque failure" while non-reinforced tires will encounter torque failure long before the treads wear out.

FIG. 7 shows a patch 120 according to another form of the invention employing four plies 122, 123, 124 and 125. The patch 120 has a central opening or hole 120a and is constructed and functions identically with the patch 20 shown in FIG. 3 except, of course, that due to the fact that an additional ply is employed, a still greater rigidity is provided in the hub area.

Additionally, of course, because of the use of four plies, the planar configuration of patch 120 will be octagonal rather than hexagonal as is the case in the three-ply patch 20. The sectional views of FIGS. 8, 9, 10 and 11 are similar to the views of FIGS. 4, 5 and 6 and are also exaggerated for purposes of illustration.

Turning next then to FIG. 12, a still further modified patch 220 having a central hole or opening 220a is illustrated. In this form of the invention, an eight-ply laminate is provided.

Basically, this particular patch consists of two four-ply laminates consisting of strips 222, 223, 224, 225 and 226, 227, 228 and 229 similar to that shown in FIGS. 7 through 11, with one of the laminates being inverted and rotated 45°. Actually inversion is not essential since one side is identical to the other. Rotation, however, is important since it achieves greater uniformity and relieves multiple ply step-off which could lead to air being entrapped within the structure. The patch 220, of course, provides still greater strength and rigidity in the hub area. It will be readily seen, therefore, that it is possible to obtain laminates of virtually any thickness and strength by utilizing multiples of the three-ply or four-ply laminates 20 and 120 herein disclosed. The strength, size and other requirements of the particular tire, would, of course, dictate the specific laminate utilized for a specific tire.

It is, of course, also possible to build a patch of any thickness by simply using the requisite number of strips. Thus, the patch can be made of a plurality of strips or a plurality of laminates each consisting of a plurality of strips.

Considering next then FIG. 21, it is believed that this figure, which shows a four-ply patch 120, quite clearly illustrates the improved strength properties obtained by the present invention.

Specifically, this figure shows a laminate made up of strips 122, 123, 124 and 125. Due to the criss-crossing and overlapping of the strips in forming the disc, it will be seen that adjacent the center circle 120a which, of course, would be the closest area to the hub, a four-ply thickness is provided, as indicated by the number 4. Progressing radially outwardly from the hub and indicated by the numeral 3, the patch decreases to a three-ply thickness which, of course, would have reduced rigidity compared to the area of four-ply thickness.

Progressing still further radially outwardly, there are areas indicated by the numbers 2 which indicate a two-ply thickness and a corresponding further reduction in rigidity. Finally, and at the outer periphery of the patch or in other words, at the ends of each strip most distant radially from the hub, there is a one-ply thickness 1 with a corresponding lowest rigidity.

It has been shown, therefore, how a simple, economical, yet effective reinforcement can be provided in the critical area of an amphibious tire, namely, adjacent the hub area thereof.

It has also been shown how this increased strength and rigidity in the hub area can be achieved without detracting from the desired resiliency or flexibility of the overall tire.

The strips of the patches 20, 120 and 220 have been identified as calender coated fabric stock and in this regard, nylon would probably be the preferred fiber material. However, the invention is not intended to be so limited since rayon and other related fibers are believed to be equally acceptable. Also, the fabric stock may be either a regular woven fabric or a non-woven fabric or a tire cord fabric.

The invention is also not intended to be limited to any particular cord count or fabric thickness since many combinations can be equally effective.

With regard to the various forms of the invention shown herein and described above, it is believed that the preferred patch from all aspects is the four-ply patch 120 of FIG. 7. This patch has been found, in practice, to solve the torque problem without causing any objectionable distortion in the sidewalls. It is also relatively inexpensive and can be made from calendered fabric stock initially intended for other purposes and does not appreciably alter the established dimensional or performance requirements of the tire.

It should also be noted that the patches could be made with a round planar configuration. While these would be ideal from the standpoint of uniformity, they are of questionable feasibility because of the expensive waste and labor problems encountered.

While a full and complete description of the invention has been set forth in accordance with the dictates of the Patent Statutes, it is to be understood that modifications can be resorted to without departing from the spirit hereof or the scope of the appended claims.

What is claimed is:

1. An amphibious tire for an all-terrain vehicle, comprising:
    A. a toroidally shaped tire body including
        1. a circumferential tread, and
        2. a pair of annular sidewalls, said sidewalls
            a. extending from the opposite side regions of said tread generally radially inwardly thereof and
            b. terminating in respective radially inwardmost edges defining a pair of coaxial central openings;
    B. an elongate rigid hub extending axially through said tire body and into both said central openings thereof;
    C. said tire body being vulcanized at the radially inwardmost edge regions of said sidewalls to said hub peripherally of the latter; and
    D. a pair of centrally apertured, planar, disc-shaped, reinforcing patches of calender coated fabric stock vulcanized to said sidewalls, respectively, with the boundaries of the central apertures of said patches generally coinciding with the periphery of said hub,
        1. each of said patches being composed of a laminate of a plurality of multilateral strips of said fabric stock and having said central aperture thereof located in the region of superimposition of all said strips, and
        2. each of said strips in each of said patches being angularly displaced in its plane about the axis of the respective central aperture relative to each next adjacent strip of the same patch to impart to that patch along any radial line thereof a plurality of radially contiguous zones of different thicknesses, with
            a. the zone of maximum thickness bounding the respective central aperture of that patch, and
            b. each successive zone as viewed in the radially outward direction from said central aperture having a lesser thickness than the immediately preceding zone;
    E. each of said sidewalls thereby having, in corresponding regions thereof surrounding said hub, an enhanced rigidity which decreases gradually in the radially outward direction of said tire body from a maximum value adjacent said hub;
    F. whereby the tire has improved torque resistance in the hub regions of said sidewalls without impairment of the overall flexibility and resiliency of the tire.

2. An amphibious tire as claimed in claim 1, wherein each of said patches is a laminate of three generally rectangular strips of said fabric stock of substantially equal lengths, said strips being arranged in crossing, asterisk-like fashion relative to each other with their end edges forming the sides of a hexagon when viewed in plan.

3. An amphibious tire as claimed in claim 2, wherein each of said patches further includes a second three-strip laminate identical to and laminated with said first-named laminate.

4. An amphibious tire as claimed in claim 3, wherein said second laminate is angularly displaced in its plane about the axis of the respective central aperture relative to said first-named laminate to dispose the two contacting middle strips of the respective patch in angularly crossing relation to each other.

5. An amphibious tire as claimed in claim 1, wherein each of said patches includes four generally rectangular strips of said fabric stock of substantially equal lengths, said strips being arranged in crossing, asterisk-like fashion relative to each other with their end edges forming the sides of an octagon when viewed in plan.

6. An amphibious tire as claimed in claim 5, wherein each of said patches further includes a second four-strip laminate identical to and laminated with said first-named laminate.

7. An amphibious tire as claimed in claim 6, wherein said second laminate is angularly displaced in its plane about the axis of the respective central aperture relative to said first-named laminate to dispose the two contacting middle strips of the respective patch in angularly crossing relation to each other.

8. An amphibious tire as claimed in claim 1, wherein an annular groove facing outwardly of the tire is provided in each of said sidewalls concentrically with said hub and adjacent the juncture thereof with the respective sidewall, each of said patches having its zone of maximum thickness located in the region of the associated groove and following the contours of the latter.

9. A sidewall-reinforcing patch for an amphibious tire having a hub to which the radially inwardmost regions of the tire sidewalls are vulcanized, comprising a planar laminate of a plurality of multilateral strips of calender coated fabric stock, said laminate in the region of superimposition of all said strips having a central aperture of a size sufficient to accommodate the hub of the tire, and each of said strips being angularly displaced in its plane about the axis of said central aperture relative to each next adjacent strip to impart to the patch along any radial line thereof a plurality of radially contiguous zones of different thicknesses, with the zone of maximum thickness bounding said central aperture, and with each successive zone as viewed in the radially outward direction from said central aperture having a lesser thickness than the immediately preceding zone.

10. A sidewall-reinforcing patch as claimed in claim 9, wherein there are provided three generally rectangular strips of said fabric stock of substantially equal lengths, said strips being arranged in crossing, asterisk-like fashion relative to each other with their end edges forming the sides of a hexagon when viewed in plan.

11. A sidewall-reinforcing patch as claimed in claim 10, further comprising a second three-strip laminate identical to and laminated with said first-named laminate.

12. A sidewall-reinforcing patch as claimed in claim 11, wherein said second laminate is angularly displaced in its plane about the axis of said central aperture relative to said first-named laminate to dispose the two contacting middle strips of the patch in angularly crossing relation to each other.

13. A sidewall-reinforcing patch as claimed in claim 9, wherein there are provided four generally rectangular strips of said fabric stock of substantially equal lengths, said strips being arranged in crossing, asterisk-like fashion relative to each other with their end edges forming the sides of an octagon when viewed in plan.

14. A sidewall-reinforcing patch as claimed in claim 13, further comprising a second four-strip laminate identical to and laminated with said first-named laminate.

15. A sidewall-reinforcing patch as claimed in claim 14, wherein said second laminate is angularly displaced in its plane about the axis of said central aperture relative to said first-named laminate to dispose the two contacting middle strips of the patch in angularly crossing relation to each other.

* * * * *